(12) United States Patent
Smidebrant

(10) Patent No.: US 10,377,261 B2
(45) Date of Patent: Aug. 13, 2019

(54) METHOD AND DEVICE FOR CHARGING AN ELECTRIC ENERGY STORAGE SYSTEM IN A VEHICLE

(71) Applicant: VOLVO TRUCK CORPORATION, Göteborg (SE)

(72) Inventor: Tobias Smidebrant, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 176 days.

(21) Appl. No.: 15/535,996

(22) PCT Filed: Dec. 15, 2014

(86) PCT No.: PCT/EP2014/003354
§ 371 (c)(1),
(2) Date: Jun. 14, 2017

(87) PCT Pub. No.: WO2016/095936
PCT Pub. Date: Jun. 23, 2016

(65) Prior Publication Data
US 2017/0341527 A1    Nov. 30, 2017

(51) Int. Cl.
*B60L 58/15*  (2019.01)
*B60L 50/16*  (2019.01)
(Continued)

(52) U.S. Cl.
CPC ......... *B60L 11/1862* (2013.01); *B60L 3/0046* (2013.01); *B60L 7/10* (2013.01);
(Continued)

(58) Field of Classification Search
None
See application file for complete search history.

(56) References Cited

U.S. PATENT DOCUMENTS

| 2008/0084186 A1 | 4/2008 | Elder et al. |
| 2008/0133076 A1 | 6/2008 | Formanski et al. |

(Continued)

FOREIGN PATENT DOCUMENTS

| WO | 2013035176 A1 | 3/2013 |
| WO | 2013129231 A1 | 9/2013 |

OTHER PUBLICATIONS

International Search Report (dated Sep. 7, 2015) for corresponding International App. PCT/EP2014/003354.

*Primary Examiner* — Lail A Kleinman
(74) *Attorney, Agent, or Firm* — WRB-IP LLP

(57) ABSTRACT

A device/method for the control of a charge operation and the State Of Charge (SOC) of an electrical Energy Storage System (ESS), e.g. a battery, that includes a multitude of cells is provided. The ESS is electrically connected to a propulsion system of a vehicle in order to power an Electric Motor. The method includes charging the ESS from an electrical power source, e.g., the grid, when the vehicle is at standstill, stopping the charging when the SOC level of the ESS is above a maintenance limit for the SOC level of the ESS, monitoring the battery and/or performing a service operation of the ESS after the ESS has been charged to a SOC level above the maintenance limit for the SOC level of the ESS, deliberately discharging the ESS to lower the SOC level. The SOC level of the ESS is reduced to a take-off limit for the SOC level of the ESS which is set in order to allow the vehicle to be controlled to use regenerative braking for charging of the ESS under subsequent driving when the vehicle is restarted and takes off.

14 Claims, 2 Drawing Sheets

(51) Int. Cl.

| | |
|---|---|
| *B60L 50/51* | (2019.01) |
| *B60L 53/00* | (2019.01) |
| *B60L 58/13* | (2019.01) |
| *B60L 15/20* | (2006.01) |
| *B60L 3/00* | (2019.01) |
| *B60L 7/10* | (2006.01) |
| *B60L 11/18* | (2006.01) |

(52) U.S. Cl.
CPC ......... *B60L 15/2072* (2013.01); *B60L 50/16* (2019.02); *B60L 50/51* (2019.02); *B60L 53/00* (2019.02); *B60L 58/13* (2019.02); *B60L 58/15* (2019.02); *B60L 2200/36* (2013.01); *B60L 2200/40* (2013.01); *B60L 2240/42* (2013.01); *B60L 2240/54* (2013.01); *B60L 2260/22* (2013.01); *B60L 2260/26* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/72* (2013.01); *Y02T 10/7275* (2013.01); *Y02T 90/14* (2013.01); *Y10S 903/903* (2013.01)

(56) References Cited

U.S. PATENT DOCUMENTS

| | | | |
|---|---|---|---|
| 2011/0246010 A1 | 10/2011 | De La Torre | |
| 2011/0313602 A1* | 12/2011 | Hirata | B60K 6/365 |
| | | | 701/22 |
| 2012/0143419 A1* | 6/2012 | Yun | B60W 10/06 |
| | | | 701/22 |
| 2012/0161708 A1 | 6/2012 | Miura et al. | |

* cited by examiner

METHOD AND DEVICE FOR CHARGING AN ELECTRIC ENERGY STORAGE SYSTEM IN A VEHICLE

BACKGROUND AND SUMMARY

The invention relates to a method and device for control of charging, discharging and State of Charge (SOC) of an electric Energy Storage System (ESS), e.g. a battery, in a vehicle. The method is suitable to be used for the control of an ESS for powering the electric powertrain of a Hybrid Electric Vehicle (HEV), e.g. a heavy-duty vehicle such as a truck, bus or construction equipment. Although the invention will be described with respect to a heavy duty HEV, the invention is not restricted to this particular kind of vehicle, but may also be used in lighter vehicles provided with an electrical powertrain, e.g. a personal car of the HEV-type. The method is also suitable furan Electric Vehicle (EV).

In order to improve fuel efficiency and provide propulsion systems having less negative impact on the environment, there is a tendency to modify common propulsion systems, using only Internal Combustion Engines (ICE), with Electrical Motors (EM). The vehicle may thus be modified by replacing the ICE with an EM to be an Electrical Vehicle (EV) or an EM may be integrated in the vehicle and cooperate with the ICE to form a Hybrid Electrical Vehicle HEV). In these vehicles, EV or HEV, there is generally a need for an electrical Energy Storage System (ESS), e.g. a battery, to provide for electrical power to the EM.

In order to reduce deterioration and reduce the decrease in storage capacity of an ESS, there is a need to monitor the ESS and control the charging and discharging of the batteries. There is in general a set limit of how much a battery may be charged before it will be damaged. The limit for how much electric energy may be charged is dependent on the size of battery, kind of battery and the way the battery is charged. The limit for how much energy that may be charged or stored in an ESS is in general set as State Of Charge (SOC) level.

The charging of batteries may generally be divided into two different kinds of charging: "Plug-in" charging by connecting the vehicle to the net when the vehicle is parked and charging under driving conditions, e.g. by regenerative braking. In general, the ESS may be charged to a higher SOC level when it is recharged at standstill from a fixed electrical power source than when recharged during travel, e.g. by regenerative braking. When the vehicle is parked and charged by a plug-in connection is it in general desired to (large the battery up to the maximum charging limit such that the electrical energy storage comprises maximum energy before starting. Still another advantage is that for certain batteries is it beneficial to provide maintenance and monitoring of the battery when it is fully charged, e.g. to correct imbalance of the battery and check other battery status values such as maximum State Of Charge (SOC) level and to monitor if the storage capacity has deteriorated. When the vehicle has been plugged in for sufficient time, the battery is thus charged to the desired level and ready to be used when the vehicle is started again. In US 2012/006866 is disclosed an example of how an ESS may be controlled and charged.

The present invention is directed to the control of the charging and discharging of the Energy Storage System (ESS) in an electrical propulsion system for a vehicle in order to improve the usability of the electrical propulsion system and thus the overall performance of the vehicle, e.g. a heavy duty HEV.

It is desirable to provide a method which improves the usability of a vehicle comprising an electrical Energy Storage System (ESS) in an electrical propulsion system by controlling the charging and discharging of the battery to be within desired State Of Charge (SOC) limits. The invention is in particular directed to the control of the SOC level of the battery when charging the battery in a parked mode, i.e. a so called "plug-in" charge using electricity from the net, and to monitor and perform maintenance of the battery before and at start-up of the vehicle after charging of the battery.

According to an aspect of the present invention, a way of controlling an electrical Energy Storage System (ESS), e.g. a battery, is disclosed. An ESS is meant to include one or several batteries which may be constituted by one or several cells which thus forms part of an on-board energy storage system. In general is the expression "an ESS" intended to be used torr a number of cells which are electrically connected to supply the same Electric Motor. The ESS may be of many different kinds, e.g. battery cells comprising Li-ions. The ESS is electrically connected to and designed to power an Electric Motor (EM) being part of an electrical propulsion system of a vehicle. The EM may be designed to be able to be used as a generator, e.g. to be used for regenerative braking for recharge of the ESS, in addition to be used as a motor for propulsion of the vehicle. The vehicle may be a Hybrid Electrical Vehicle (HEV) or an Electrical Vehicle (EV). The method comprises the steps of;

Charging the ESS from an electrical power source, e.g. the grid, when the vehicle is at standstill. During this step is the EM also usually turned off.

Stop the charging when the SOC level of the ESS (SOCEss) is above a maintenance limit for the SOC level of the ESS (SOC L). This limit will also be referred to as "maintenance limit". Hence, the battery is charged to reach a certain level in order to perform the next step.

Monitoring the battery and/or performing a service operation of the ESS after the ESS has been charged to a SOC level above said maintenance limit (SOCML)—It may be desired to have the ESS charged to a relative high SOC level (SOCEss) in order to be able to perform service operations such as balancing of the battery cells of the ESS. The maintenance limit may differ depending on the desired monitoring or service operation that is to be done and may be defined as a SOC limit above which it is suitable to perform maintenance of the ESS.

Deliberately discharge the ESS to lower the SOC level. To maintain the ESS at a high SOC level, e.g. above the maintenance limit, as a storage SOC level of the ESS may have a negative impact on the functionality of the ESS and reducing its capacity and shorten its life cycle. The control system may thus be designed to reduce the SOC level after the ESS has been charged, e.g. when there is a desire to have a SOC level below a predefined storage limit of the SOC level of the ESS (SOCSL) at which the ESS may the stored with less deterioration of its function and capacity. This limit will also be referred to as "storage".

However, in the present invention, it is realized that there are further parameters which are of interest when setting a desired SOC level after recharging the ESS. Above is described there may be an interest in reducing the SOC level with respect to storage properties and the SOC of the ESS should be controlled to below a storage limit. From this point of view, the ESS should be controlled to optimize the SOC level of the ESS to be as high as possible without having a level which may be harmful to the ESS during storage.

In the present invention there is still another parameter to be considered which is a desired upper limit of the SOC level at vehicle start-up or take-off. Hence, the ESS should be controlled to be at or below an appropriate SOC level when starting up the vehicle and taking off. The SOC level in the ESS shall thus be reduced to be below a take-off limit for the SOC level of the ESS (SOCTOL)—This limit of the SOC value will also be referred to as "take-off limit". The take-off limit is set in order to allow regenerative charging of the ESS under subsequent driving following the recharge of the ESS when the vehicle is at rest. The main purpose for setting a take-off limit is to assure the SOC level will be low enough such that it will be possible to use the EM as generator for regenerative braking for the driving operation following start-up and take-off. For certain operations there is a strong desire to be able to use regenerative braking since there may be no other suitable actions to be performed if it is not possible to use the EM as a generator, e.g. for regeneratively braking the EM during a first gear up-shift operation. In many cases is there no other possibility to slow down an EM than applying an electrical load why the operation of the vehicle may suffer if a braking action not is possible for the EM. In the example above, when the EM needs to slow down during an upshift, will the consequence be that the upshift must wait or that the shifting action is allowed to take more time if the EM can't be slowed down.

Hence, by the provision of a method which comprises the feature of controlling the SOC level of the ESS (SOCESS) to be below a take-off limit, the advantage to allow the vehicle to be controlled to use regenerative braking for charging of the ESS under subsequent driving right after take-off may be achieved. Please note that the feature of allowing the regenerative braking action to occur not necessarily needs to be desired from an energy conservative point of view but may also be desired from a vehicle controllability point of view. If the SOC level is set to be too high, regenerative braking may not be possible to use or only be used with a limited braking force, which may negatively influence desired driving characteristics.

There may thus be several different criteria which may be used for setting the take-off limit for the SOC level of the ESS (SOCTOL). The take-off limit should preferably be set such that it allows the EM to be decelerated while the braking energy from deceleration of the EM is used in order to charge the ESS without reaching a driving limit for the SOC level of the ESS (SOCQL) under subsequent driving when the vehicle is used according to a predicted driving sequence. This limit will also be referred to as "driving limit". The predictive driving sequence may be hard to predestine for a longer time. However, there is in general performed an upshift performed right after take-off for which regenerative braking of the EM could be used and, in general, is desired to be used. In some cases regenerative braking is the only option to slow down the EM. It is thus preferred that the take-off limit (SOCTOL) is set such that the increase of the SOC level due to charging of the ESS by regenerative braking of the EM during the upshift not causes the SOC level to reach the driving limit (SOCDL).

The EES should thus be discharged to be below the take-off limit for the SOC level of the ESS (SOCTOL) before there is an upshift from the starting gear when the vehicle is started and driven after the charging. This value for the take-off limit could be some kind of default level for the take-off limit when no further information is available concerning an estimated use or route of the vehicle.

However, the setting of the take-off limit (SOCTOL) could be made in dependence of a predicted charging and discharging sequence of the ESS for a known or predicted route to be driven by the vehicle. The take-off limit (SOCTOL) should thus be set low enough in order to avoid the SOC level (SOCESs) to reach above the driving limit (SOCDL) due to charging of the ESS by regenerative braking when the vehicle follows the predicted route. The SOC level could thus be controlled to be below the take-off limit when the vehicle is started at vehicle take-off.

Electrical energy from the discharge of the ESS, in which the SOC level in the ESS is lowered to be below the take-off limit (SOCTOL), may be used to charge a starter battery. This feature is in particular useful since there is a need to recharge a starter battery which has been used to start an engine. The SOC level could for example be controlled such that it is slightly above the take-off limit before starting the engine, e.g. before a key-on status is sensed. Thereafter is the ESS used to recharge the starter battery right after the key-on status and start-up of the engine is, detected at take off. There will thus be a rather well known amount of electricity which (at least) will be used for starting the vehicle and may be discharged from the ESS during start-up to recharge the starter battery (and possibly be used for other power consuming entities at vehicle start-up). These power consuming entities (including the starter battery) may thus be used while discharging energy from the ESS to reach a SOC level (SOCEss) to be below a take-off limit for the SOC level of the ESS (SOCTOL)—To be noted, charging of a starter battery from the ESS is also beneficial to perform before a vehicle start-up or key on status and may be performed in a key-off status right after the charging and the monitoring and/or service operation in a key off status. Hence, the discharging of the ESS to lower the SOC level to be below a take-off level may be performed before the vehicle is restarted, e.g. during a key-off status, by using it for appropriate power consuming activities of the vehicle. The ESS may for example be controlled in association with the charging operation, and after the monitoring and/or service operation of the ESS performed above said maintenance limit for the SOC level of the ESS (SOCML), to be finally discharged to a level below the take-off limit.

The discharging operations of the ESS could of course be performed both before and after a start-up indication. The SOC level could be finally controlled to be below the take-off limit (SOCJOL) when the vehicle is restarted during vehicle start-up while the SOC level already is reduced to an appropriate SOC storage level right after the charging and monitoring/service operations. The SOC level could be kept as high as decided suitable from the storage criteria. Thereafter, at start up, it is decided if the ESS should be further discharged to reach a desired take-off limit for the SOC level of the ESS (SOCTOL)—The method described herein may be used for controlling a EV or HEV and is particularly useful to be used when a vehicle is driven in an electric mode, e.g. only the electrical propulsion system, electrically connected to the ESS, is used when the vehicle is restarted and driven after the charging.

The invention further relates to a computer program comprising program code means for performing the control steps as described above said program is run on a computer.

The invention also relates to a computer readable medium carrying a computer program comprising program code means for performing the control steps as described above when said program product is run on a computer.

The invention further relates to a control unit, e.g. an Electronic Control Unit (ECU), for control of an electrical Energy Storage System (ESS), the control unit being configured to perform the steps of the method as described herein.

The invention also includes a control system for a vehicle provided with an electrical propulsion system comprising an Electric Motor (EM) electrically connected to an electrical Energy Storage System (ESS) and a control unit connected to the electrical propulsion, the control unit configured as described above. The invention also relates to a vehicle comprising a control system, as described herein, e.g. a Hybrid Electrical Vehicle (HEV) such as a heavy duty vehicle such as a truck or bus.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3b is a flow chart of a modified version of the charging control method in FIG. 3a.

DETAILED DESCRIPTION

Figure 1:
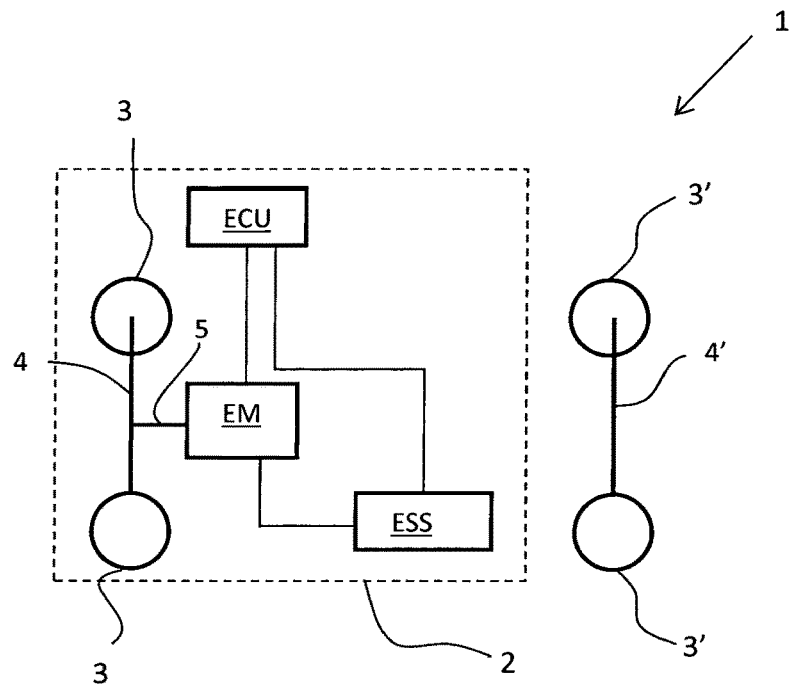
FIG. 1 is a schematic view of an Electric Vehicle (EV) suitable for the present invention.

In FIG. 1 is shown a vehicle 1 comprising an electric propulsion system 2. The electric propulsion system 2 comprises a pair of driven wheels 3 attached to a driven axle 4 which is drivingly connected to an output shaft 5 of an Electric Motor (EM). The Electric Motor (EM) is electrically connected to an electric Energy Storage System (ESS) for powering the electric motor (EM). The electric propulsion system 2 further comprises an Electronic Control Unit (ECU) connected to the electric Energy Storage System (ESS) and the Electric Motor (EM) in order to monitor and/or control the ESS and EM. The vehicle 1 further comprises a second pair of wheels 3' connected to a second axle 4' which wheels 3' not are driven.

The above described vehicle is only intended to serve as an example of an Electric Vehicle (EV) suitable for the control system according to the invention. The system may be modified, e.g. may the Electric Motor (EM) also be drivingly connected to the second axle 4' such that both wheel pairs 3, 3' are driven by the EM. Alternatively, still another electric motor may be included to provide a propulsion force to the second axle 4'. A second electric motor may thus be electrically connected to either the existing electrical Energy Storage System (ESS) or to another, separate electrical energy storage system. If desired, electric motors designed to be drivingly connected to a driven axle could be replaced for electrical motors designed to work directly on a wheel, e.g. replacing an electric motor drivingly connected to a driven axle with a wheel hub electric motor for each driven wheel on the axle. Hence, the electric propulsion system for the EV intended to be used for the control system may have a wide variety of different design as long as there is an electrical Energy Storage System (ESS) on board the vehicle intended to function as a power source for an Electric Motor (EM).

Figure 2:
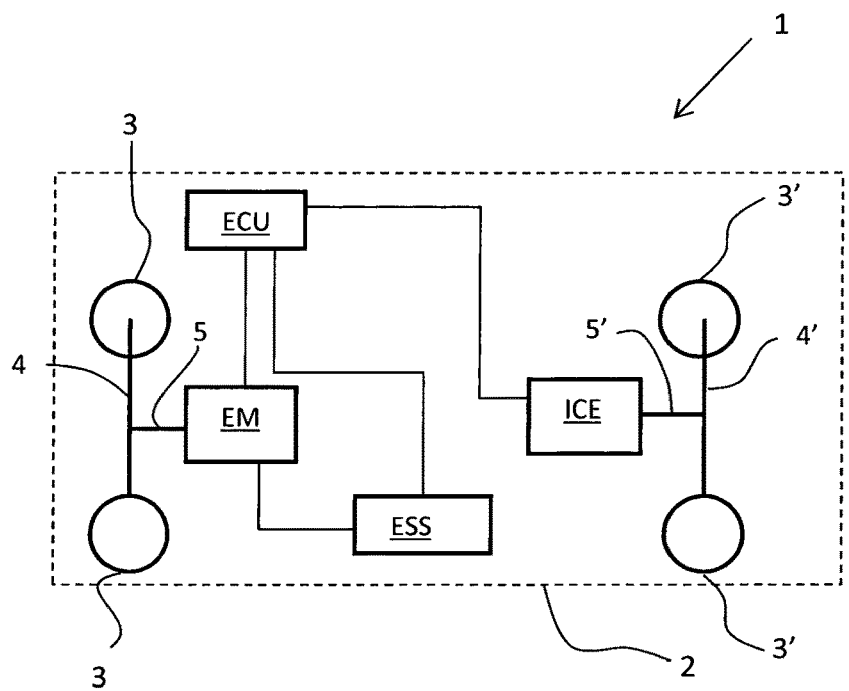
FIG. 2 is a schematic view of a Hybrid Electric Vehicle (HEV) suitable for the present invention.

In FIG. 2 is shown a vehicle 1 having an Internal Combustion Engine (ICE) in addition to the Electrical Motor (EM). The same reference numbers have been used for the same features as described in FIG. 1. Compared to FIG. 1 has thus the Internal Combustion Engine (ICE) been added and is drivingly connected to the second axle 4' via an ICE output shaft 5'. The ICE is also connected to the ECU in order to receive control signals. The vehicle 1 in FIG. 2 thus represents a Hybrid Electric Vehicle (HEV).

The above described vehicle is only intended to serve as an example of an Hybrid Electric Vehicle (HEV) suitable for the control system according to the invention. The HEV could for example instead be a parallel hybrid, a series hybrid or a series/parallel hybrid. Hence, the hybrid propulsion system for the HEV intended to be used for the control system may have a wide variety of different designs as long as there is an electrical Energy Storage System (ESS) on board the vehicle intended to function as a power source for an Electric Motor (EM).

Figure 3A:
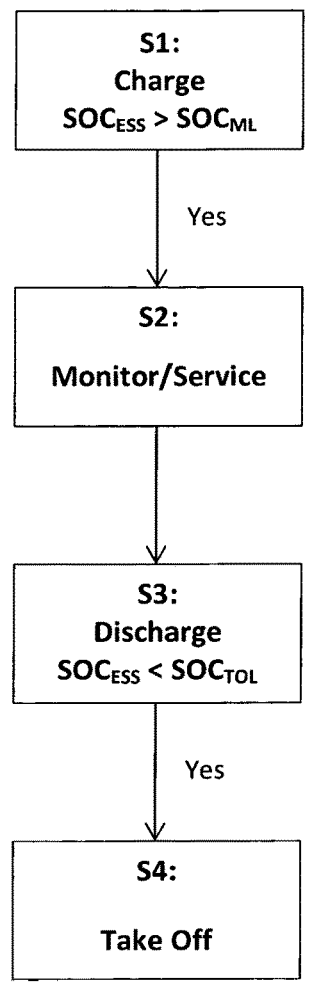
FIG. 3a is a flow chart for a charging control method for an electric Energy Storage System (ESS) according to an embodiment of the present invention.

In FIG. 3a is a flow chart for the control method for an electrical Energy Storage System (ESS) according to an embodiment of the invention.

In a first step, S1, is the electrical Energy Storage System (ESS) charged. The State Of Charge of the ESS (SOCEss) is compared with a maintenance limit for the State Of Charge (SOC L) above which a monitoring or service operation may be performed. Hence, the ESS is charged until it has reached a SOC level which is above the maintenance limit for the State Of Charge, i.e. until SOCESs>SOCML. When the desired SOCEss has been reached continue the method with the next step, S2

In a second step, S2, is there a monitoring or service operation performed of the ESS. For certain monitoring or service operation is it desired to have a rather high SOC level, e.g. when deciding if a balance operation is desired as well as when performing a balance operation. The operation may thus for example be balancing of cells in the ESS. This monitoring and/or service operation may include further charging and/or discharging of the ESS while being at a high SOC level. This maintenance step is followed by the third step, S3.

In a third step, S3, is the SOC level of the ESS (SOCESS) lowered by discharging the ESS. The SOC level of the ESS is compared with a desired take off limit of the SOC level of the ESS (SOCJOL) below which the vehicle is having a SOC level considered suitable for starting the vehicle and take off. The ESS is thus discharged until the SOC level has reached a value below the desired take off limit (SOCJOL) where after step 4, S4 follows.

In step 4 is the vehicle started and takes off having its SOC level below the take-off limit (SOCJOL)—This limit, SOC-TOL, may be set to a default value below which the driving operations when a vehicle is restarted in general may control the EM to perform braking operations as desired without reaching a driving limit of the SOC of the ESS (SOCDL)—This driving limit (SOCDL) is a SOC level up to which the ESS may be recharged by regenerative braking of the EM without causing any significant deterioration of the ESS. The default value of the take-off limit may for example be set to be able to use the EM as a generator during regenerative braking for recharging of the ESS during a first gear up-shift without reaching the driving limit (SOCDL). Of course could also further actions which in general are performed at start causing a regenerative braking of the EM also be included in the estimation of a default take-off limit. The take-off limit (SOCTOL) could also be set in dependence of an expected regenerative braking of the EM to be used for recharging of the ESS from a predicted route or certain starting position of the vehicle. The lowering of the SOC level in the ESS is thus in general made in order to be able to use the EM as predicted for regenerative braking without causing the SOC level to rise above the driving limit of the SOC of the ESS (SOCDL)—In FIG. 3a is the SOC level of the ESS reduced in step S3 to a level below the take-off limit of the SOC level of the ESS (SOCTOL)—It is herein not specified at which time point, or by which trigger actions, the SOC level is reduced to be below the take-off limit. In case it is considered appropriate, the SOC level may be controlled to be below the take-off limit of the SOC level (SOCJOL) right after the monitoring or servicing sequence. However, it is also possible that the lowering of the SOC level to be below the SOCTOL not is made until there is an indication the vehicle is restarted for take-off, e.g. a key on indication.

Figure 3B:
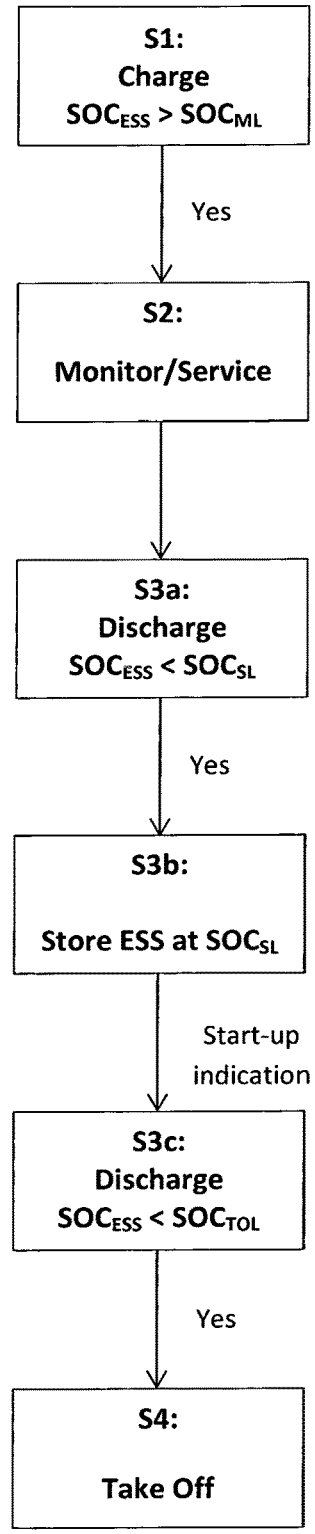

In FIG. 3b has the step 3, S3, from FIG. 3a been divided into three sub steps, step S3a, S3b and S3c in order to further specify how the SOC level may be controlled after the monitoring and/or servicing step S2 and before the vehicle is started to take off in step S4.

In step S3a is disclosed that the SOC level of the ESS (SOCEss) is lowered to be below the storage limit of the SOC of the ESS (SOCSL). AS previously discussed, there may be a desire to tower the SOC level of the ESS after the monitoring/servicing action in order to reduce the storage limit after charging, i.e. the ESS is discharged directly following the charging (S1) and monitoring/servicing (S2) routine to have a SOC level below the storage limit (SOCSL)—When storage limit has been reached step S3b follows.

In step S3b is the ESS controlled to be maintained at the storage limit of the SOC of the ESS (SOCSL)—The SOC level will maintain at this level until there is an indication the vehicle is or soon will be restarted for take-off, e.g. a key-on indication. There is thus no lowering of the SOC level to be below the SOCTOL made until there is an indication the vehicle is restarted. The reason for waiting could for example be that the predicted future use of the vehicle not is known. If waiting until the vehicle is restarted, or until there is an start-up indication, is it possible there may be a better chance to know how the vehicle is expected to be used in the near future and the SOCTOL may be set more accurately and the SOCEss level controlled accordingly. This could for example be the case for a vehicle in a vehicle fleet which is assigned a certain route at, or slightly before, start up in the morning where after the SOC level is controlled to a desired take off level. Another reason for not lowering the SOC level more than necessary may be that it is unsure for how long time the vehicle not will be used and there may be a desire to have some extra electric power saved for maintenance operation if the vehicle happens to be parked for a longer tithe, e.g. a week or more. When the vehicle receives a start-up indication follows step S3c.

In step 3c is the SOC level controlled in dependence of the start-up indication to be below the take-off limit. The start-up indication could be a key on indication where after a soon take-off is expected. However, it could also be a remote signal indicating the vehicle will be used at a certain time point (and possibly for a certain use) such that the SOC-level will be set to an appropriate take-off limit for the expected purpose at a convenient time. When the SOC level is below the take-off limit follows step S4 and the vehicle is ready to be started and take off.

It is to be understood that the present invention is not limited to the embodiments described above and illustrated in the drawings; rather, the skilled person will recognize that many changes and modifications may be made within the scope of the appended claims.

The invention claimed is:

1. A method for the control of a charge operation and the State of Charge (SOC) of an electrical Energy Storage System (ESS) comprising a multitude of cells, the ESS electrically connected to a propulsion system of a vehicle in order to power an Electric Motor (EM), the method comprising the steps of:

Charging the ESS from an electrical power source, e.g. the grid, when the vehicle is at standstill, Stop the charging when the SOC level of the ESS (SOCESS) is above a maintenance limit for the SOC level of the ESS (SOCML), Monitoring the ESS and/or performing a balance operation of the ESS after the ESS has been charged to a SOC level above the maintenance limit for the SOC level of the ESS (SOCML), Deliberately discharging the ESS to lower the SOC level, wherein the SOC level of the ESS (SOCESS) is reduced to a take-off limit for the SOC level of the ESS (SOCTOL) before there is an upshift from the starting gear when the vehicle is started and driven after the charging, the take-off limit for the SOC level of the ESS (SOCTOL) being set such that the increase of SOC level of the ESS (SOCESS) due to charging of the ESS by regenerative braking of the EM during the upshift does not cause the SOC level of the ESS (SOCESS) to reach a driving limit for the SOC level of the ESS (SOCDL), wherein the driving limit for the SOC level of the ESS (SOCDL) is preferably set such that the ESS does not deteriorate.

2. A method according to claim 1, wherein the method further comprises:

Setting the take-off limit for the SOC level of the ESS (SOCTOL) such that it allows the EM to be decelerated while the braking energy from deceleration of the EM is used in order to charge the ESS without reaching a driving limit for the SOC level of the ESS (SOCDL) under subsequent driving when the vehicle is used according to a predicted driving sequence.

3. A method according to claim 1, wherein the method further comprises:

Setting the take-off limit for the SOC level of the ESS (SOCTOL) in dependence of a predicted charging and discharging sequence of the ESS for a known or predicted route to be driven by the vehicle and controlling the SOC level of the ESS (SOCESS) to be below the take-off limit for the SOC level of the ESS (SOCTOL) when the vehicle is started and driven after the charging in order to avoid the SOC level of the ESS (SOCESS) to reach a driving limit for the SOC level of the ESS (SOCDL) due to charging of the ESS by regenerative braking.

4. A method according to claim 1, wherein the method further comprises:

Balancing of the cells is performed as a service operation of the ESS after the ESS has been charged to a SOC level above the maintenance limit for the SOC level of the ESS (SOCML).

5. A method according to claim 1, wherein the method further comprises:

Using electrical energy from the discharge of the ESS, in which the SOC level of the ESS (SOCESS) is lowered from being above the maintenance limit for the SOC level of the ESS (SOCML) to be below a take-off limit for the SOC level of the ESS (SOCTOL), to charge a starter battery.

6. A method according to claim 1, wherein the method further comprises:
Discharging of the ESS to lower the SOC level of the ESS (SOCESS) to be below a take-off limit for the SOC level of the ESS (SOCTOL) is performed before the vehicle is restarted, e.g. by discharging the ESS right after the monitoring and/or balance operation of the ESS above the maintenance limit for the SOC level of the ESS (SOCML).

7. A method according to claim 1, wherein the method further comprises:
Discharging of the ESS to lower the SOC level of the ESS (SOCESS) to be below a take-off limit for the SOC level of the ESS (SOCTOL) is performed when the vehicle is restarted during vehicle start-up.

8. A method according to claim 1, wherein the method further comprises:
using only the electrical propulsion system, electrically connected to the ESS, when the vehicle is restarted after the charging.

9. A computer comprising a computer program for performing the steps of claim 1 when the program is run on the computer.

10. A non-transitory computer readable medium carrying a computer program for performing the steps of claim 1 when the program product is run on a computer.

11. A control unit for controlling an electrical Energy Storage System (ESS), the control unit being configured to perform the steps of the method according to claim 1.

12. A control system for a vehicle provided with an electrical propulsion system comprising an Electric Motor (EM) electrically connected to an electrical Energy Storage System (ESS) and a control unit connected to the electrical propulsion system, comprising a control unit according claim 11.

13. A vehicle comprising a control system according to claim 12.

14. A vehicle according to claim 12, wherein the vehicle is a Hybrid Electrical Vehicle (HEV).

* * * * *